(No Model.)

R. GEMMELL.
CAR COUPLING.

No. 352,534.  Patented Nov. 16, 1886.

Witnesses.
Geo East
M. Wills

Inventor.
Robert Gemmell
by L. Tomlinson &c.
Attorneys

UNITED STATES PATENT OFFICE.

ROBERT GEMMELL, OF COLUMBUS, ONTARIO, CANADA.

CAR-COUPLING.

SPECIFICATION forming part of Letters Patent No. 352,534, dated November 16, 1886.

Application filed March 1, 1886. Serial No. 193,658. (No model.)

*To all whom it may concern:*

Be it known that I, ROBERT GEMMELL, a subject of the Queen of Great Britain, residing at Columbus, in the Province of Ontario, Canada, have invented a new and useful Improvement in Car Couplers; and I hereby declare that the following is a full, clear, and exact description of the same.

Figure 1:
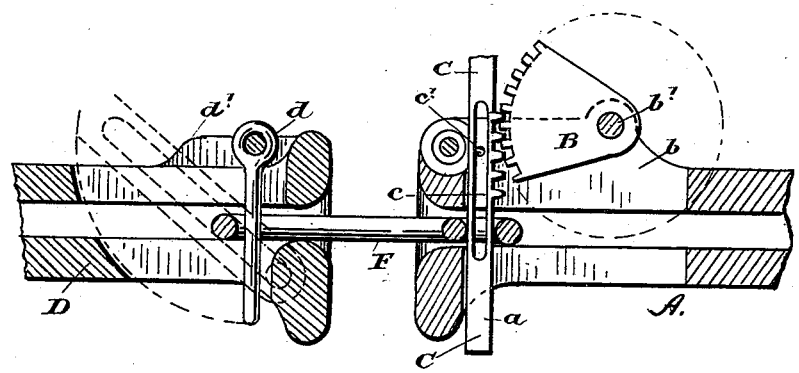
Figure 2:
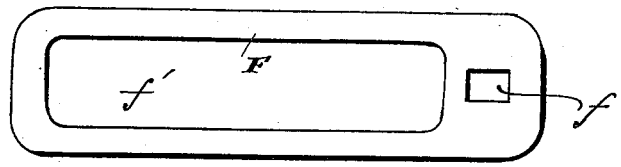
Figure 3:
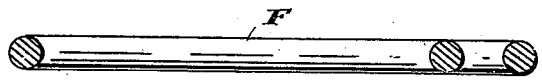

In the drawings, which form a part of this specification, Figure 1 represents a vertical longitudinal section of my improved car-coupling. Fig. 2 is a plan view of the link. Fig. 3 is a longitudinal section of the link.

In course of a long experience I have found that a great difficulty exists in adjusting the couplings now in use. It will be observed that the height of cars varies to some extent, and great difficulty is experienced in any method of self-coupling which has hitherto attracted any notice. This difficulty I propose to obviate in the manner following—that is to say:

In the ordinary draw-head A, I provide and fix a spindle, $a$, so situated in its bearings (whether forming part of the draw-head or suitably attached thereto) as to occupy the position shown in Fig. 1. In the rear of this spindle $a$, I provide bearings $b$, in which is loosely journaled a spindle or gudgeon, $b'$. This gudgeon carries a cam, B. I here prefer to show it as a quadrant, or nearly so; but I do not confine myself to this figure. The cam or quadrant B has on its periphery teeth which mesh into corresponding teeth in the ratchet C, which is furnished with a slot, $c$, which slot is the traversing length of the bar or pin C.

$c'$ is a pin, which is used to control the upward and downward thrust of the pin C.

It will be easily understood that the leverage, in whatever manner applied, which will act on the spindle or gudgeon $b'$ will raise or lower the coupling-pin C at will.

I may here observe that all the elements of my invention are applicable to the ordinary draw-head.

I will now describe the corresponding coupling arrangement. In the draw-head, which is marked D in the drawings, I fix a pin, $d$, loosely journaled on its bearings $d'$. In the body of the draw-head I provide a vertical slot, E, of sufficient length and curvature to insure the free passing of the pin $d$ to and fro.

F is a link having an opening, $f$, to engage the vertically-movable pin C, and a slot, $f'$, to engage the pivoted or swinging pin $d$.

It will be seen from the above description that on the impact of the cars meeting, the link F will strike the pin $d$, and, forcing it to its full limit of swinging action, will cause the pin $d$ to drop into its initial position, thus locking the cars.

What I claim as my invention, and desire to secure by Letters Patent, is—

In a car-coupling, the combination of the draw-head A, having a ratcheted vertically-movable pin, C, and a toothed cam, B, engaged with said pin, the draw-head D, having a swinging coupling-pin, $d$, and the link F, having an opening, $f$, to engage the vertically-movable pin C, and a slot, $f'$, to engage the swinging pin $d$, substantially as described.

ROBERT GEMMELL.

Witnesses:
  J. BALDWIN HANDS,
  J. H. DENTON.